United States Patent
Hsu (10) Patent No.: US 12,420,640 B2
(45) Date of Patent: Sep. 23, 2025

(54) DISPLAY CONTROL DEVICE, DISPLAY EQUIPMENT, AND VEHICLE EMPLOYING DEVICE

(71) Applicants: Futaijing Precision Electronics (Yantai) Co., Ltd., Yantai (CN); HON HAI PRECISION INDUSTRY CO., LTD., New Taipei (TW)

(72) Inventor: Hao-Chun Hsu, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 142 days.

(21) Appl. No.: 18/228,718

(22) Filed: Aug. 1, 2023

(65) Prior Publication Data
US 2024/0416754 A1    Dec. 19, 2024

(30) Foreign Application Priority Data
Jun. 19, 2023   (CN) .......................... 202321565726.0

(51) Int. Cl.
| | | |
|---|---|---|
| *B60K 35/60* | (2024.01) | |
| *B60K 35/50* | (2024.01) | |
| *B60K 35/10* | (2024.01) | |
| *B60K 35/22* | (2024.01) | |
| *B60K 35/28* | (2024.01) | |

(52) U.S. Cl.
CPC .............. *B60K 35/60* (2024.01); *B60K 35/50* (2024.01); *B60K 35/10* (2024.01); *B60K 35/22* (2024.01); *B60K 35/28* (2024.01); *B60K 2360/139* (2024.01); *B60K 2360/1438* (2024.01); *B60K 2360/162* (2024.01); *B60K 2360/167* (2024.01)

(58) Field of Classification Search
CPC ........ B60K 35/50; B60K 35/60; B60K 35/28; B60K 2360/139; B60K 2360/167
See application file for complete search history.

(56) References Cited

U.S. PATENT DOCUMENTS

| | | | | |
|---|---|---|---|---|
| 2010/0195847 | A1* | 8/2010 | Ieda ...................... | G01C 21/265 381/119 |
| 2013/0145360 | A1* | 6/2013 | Ricci ....................... | H04L 41/14 717/174 |
| 2022/0177042 | A1* | 6/2022 | Yonezawa .............. | B60K 35/00 |
| 2024/0146836 | A1* | 5/2024 | Seger, Jr. .............. | G06F 3/0448 |

FOREIGN PATENT DOCUMENTS

CN    215621411 U   *  1/2022

\* cited by examiner

*Primary Examiner* — Zhubing Ren
(74) *Attorney, Agent, or Firm* — ScienBiziP, P.C.

(57) ABSTRACT

A display control device comprises a support arm, a control panel, and a signal transmission circuit board. A first end of the support arm is configured to install the main control screen. A second end of the support arm is extended in a direction away from a front surface of the main control screen, and the control panel is arranged on the second end of the support arm. The control panel is configured to output a trigger signal. The signal transmission circuit board is configured to transmit the trigger signal to a host of the vehicle, the signal transmission circuit board is further configured to receive a display signal and transmit the display signal to the control panel, the display signal is configured to control the control panel to display corresponding vehicle status information. A display equipment and a vehicle are also provided.

16 Claims, 7 Drawing Sheets

DISPLAY CONTROL DEVICE, DISPLAY EQUIPMENT, AND VEHICLE EMPLOYING DEVICE

TECHNICAL FIELD

The subject matter herein generally relates to display control devices of vehicle.

BACKGROUND

In current vehicles, users can control volume, temperature, and wind speed through control buttons or a central control panel. The control buttons and the central control panel are far away from the driver, which is not easy for the driver to operate.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
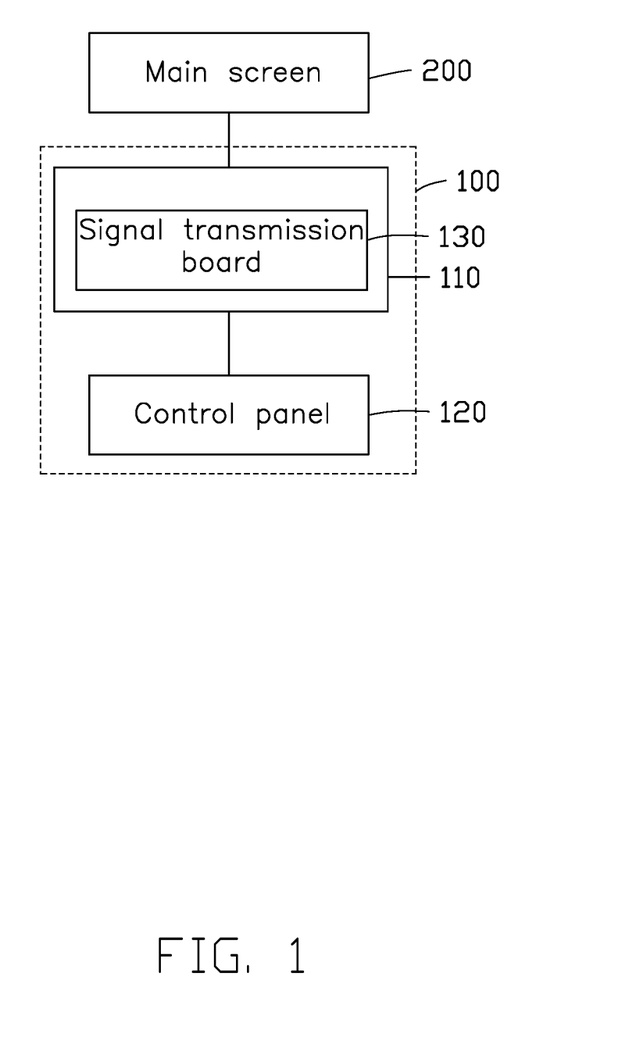
FIG. 1 is a diagram of one embodiment of a display control device according to the present application.
Figure 7:
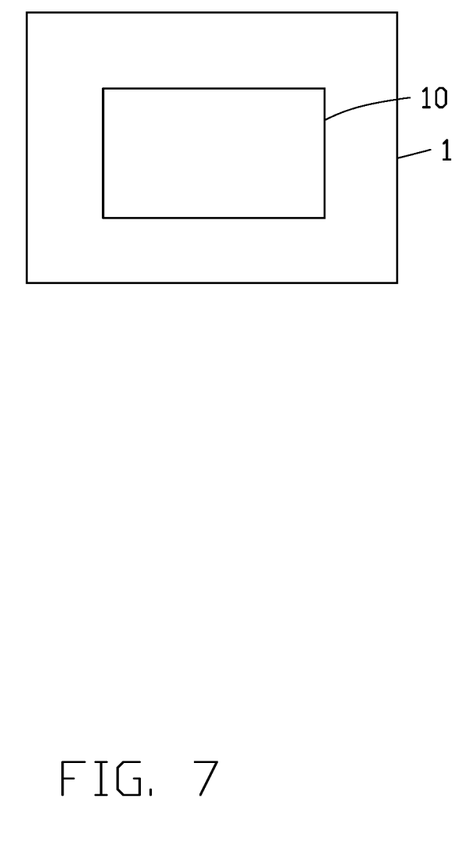
FIG. 7 is a diagram of one embodiment of a vehicle according to the present application.

FIG. 1 is a diagram of one embodiment of a display control device 100 according to the present application. The display control device 100 can be set in a vehicle 1 (as shown in FIG. 7). The vehicle 1 comprises a main control screen 200. The display control device 100 is configured to provide proper placement for the main control screen 200 and a control panel 120, and improve the safety of the vehicle 1 during driving.

The display control device 100 comprises a support arm 110, the control panel 120, and a signal transmission circuit board 130. A first end of the support arm 110 is configured to install the main control screen 200. A second end of the support arm 110 extends to a direction away from a front surface of the main control screen 200, and the control panel 120 is arranged on the second end of the support arm 110. The signal transmission circuit board 130 is arranged in the support arm 110 and electrically connected with the control panel 200. The control panel 200 is configured to output a trigger signal. The signal transmission circuit board 130 is configured to transmit the trigger signal to a host of the vehicle 1. The signal transmission circuit board 130 is further configured to receive a display signal and transmit the display signal to the control panel 200. The display signal is configured to control the control panel 200 to display corresponding vehicle status information.

In one embodiment, the support arm 110 is designed as a curved extension shape, so that the two ends of the support arm 110 are staggered on a vertical plane to provide space for the main control screen 200 to be placed and rotated. In a practical application, the second end of the support arm 110 extended in the direction away from the front surface of the main control screen 200 is closer to the driver, and the control panel 120 mounted on the second end of the support arm 110 is also closer to the driver and convenient for the driver to touch and operate. The main control screen 200 is farther away from the driver than the control panel 120, thus making it more convenient for the driver to view the information on the control panel 120 than on the main control screen 200. The main control screen 200 can be set to rotate, and the control panel 120 is fixed. After a rotation of the main control screen 200, the control panel 120 remains in the same position, so that the user can get used to the position and touch of the control panel 120, and operate the control panel 120 without moving the sight. Among them, the control panel 120 can be installed above, below, to the left or right of the main control screen 200, and there is no restriction here.

The display control 100 further comprises connectors which can be arranged on the side, bottom, etc., of the support arm 110. The display control 100 can be electrically connected to the host of the vehicle 1 and the power supply through the connectors. The signal transmission circuit 130 can receive the power supply voltage through the connector and transmits the power supply voltage to the backlight of the control panel 120 for luminous display. The driver can touch the control panel 120 to output the trigger signal. The control panel 120 transmits the trigger signal to the host of the vehicle 1 through the signal transmission circuit 130. The host performs the corresponding operation and generates the display signal according to the trigger signal, and transmits the display signal to the control panel 120 through the signal transmission circuit 130. The control panel 120 displays the corresponding vehicle status information according to the display signal, realizing the adjustment of vehicle status and the display of adjusted information. For example, when the temperature needs to be adjusted, the corresponding area on the control panel 120 can be touched, and the control panel 120 outputs the temperature control signal, which can be transmitted to the host of the vehicle 1 through the signal transmission circuit 130. The host controls an execution system of the vehicle 1 according to the temperature control signal to adjust the temperature of the vehicle 1, and generates the temperature display signal after the temperature is adjusted. The temperature display signal can be output to the control panel 120 through the signal transmission circuit to control the control panel 120 to display the adjusted temperature parameters.

In addition, the main control screen 200 can also receive the display signal, the corresponding vehicle status information, or the main control screen 200 does not display the corresponding vehicle status information (that is, the display signal is not transmitted to the main control screen 200).

The control panel 120 can be triggered to output the trigger signal and display the corresponding vehicle status information according to the display signal. The signal transmission circuit board 130 can transmit the trigger signal and the display signal.

The main control screen 200 and the control panel 120 can be installed on the first and second end of the support arm 110 of the suspension hook structure, to provide enough space for the placement and rotation of the main control screen 200, which does not affect the use of the main control screen 200, and is convenient for the driver to operate the control panel 120 and view the vehicle status information.

Figure 2:
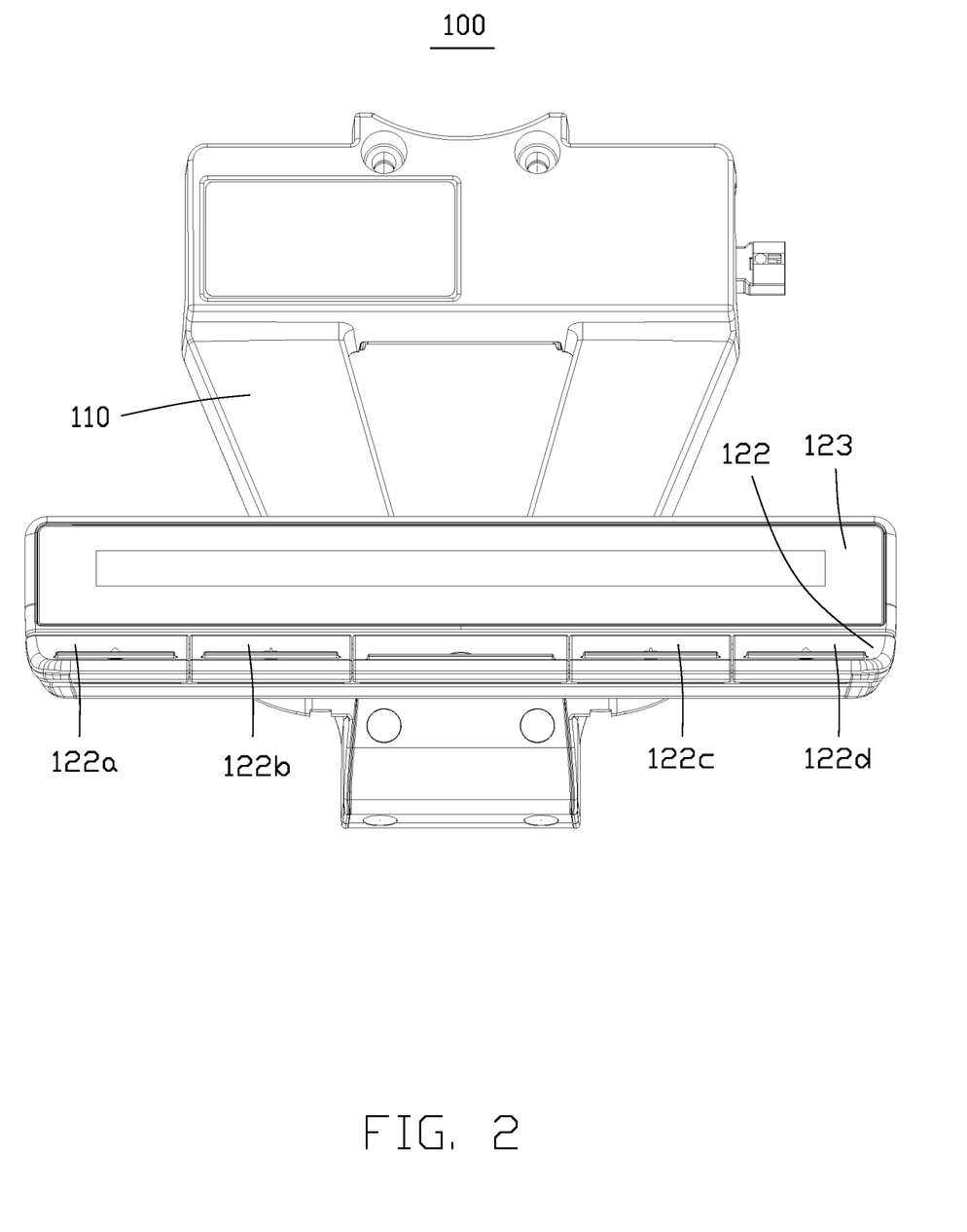
FIG. 2 is a front view of one embodiment of a control panel according to the present application.
Figure 3:
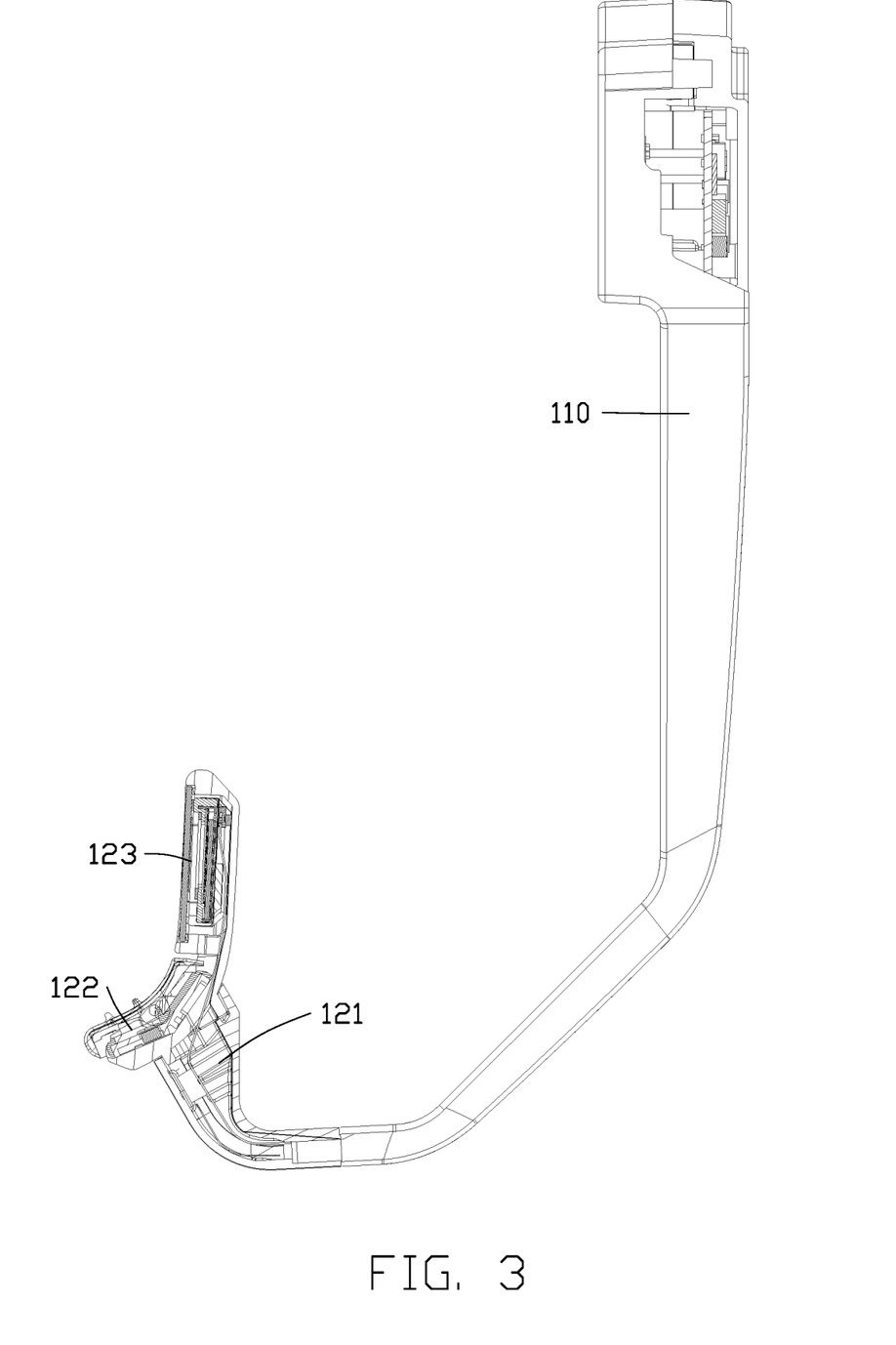
FIG. 3 is a side view of one embodiment of the control panel according to the present application.

Referring to FIGS. 2 and 3, The support arm 110 is a Y-shaped structure, an upper end of the Y-shaped structure is configured to install the main control screen 200, a lower end of the Y-shaped structure is extended away from the front surface of the main control screen 200, the control panel 120 is arranged on the lower end of the Y-shaped structure.

In one embodiment, the support arm 110 is arranged as Y-shape, which can strengthen the structure of the support arm 110, and enable the operator to have sufficient supporting force when applying force on the control panel 120 arranged on base of the Y-shaped structure. The main control screen 200 is arranged at the upper end of the Y-shaped structure, and can provide more stable support for the main control screen 200 through the two arms of the Y-shaped structure.

Figure 4:
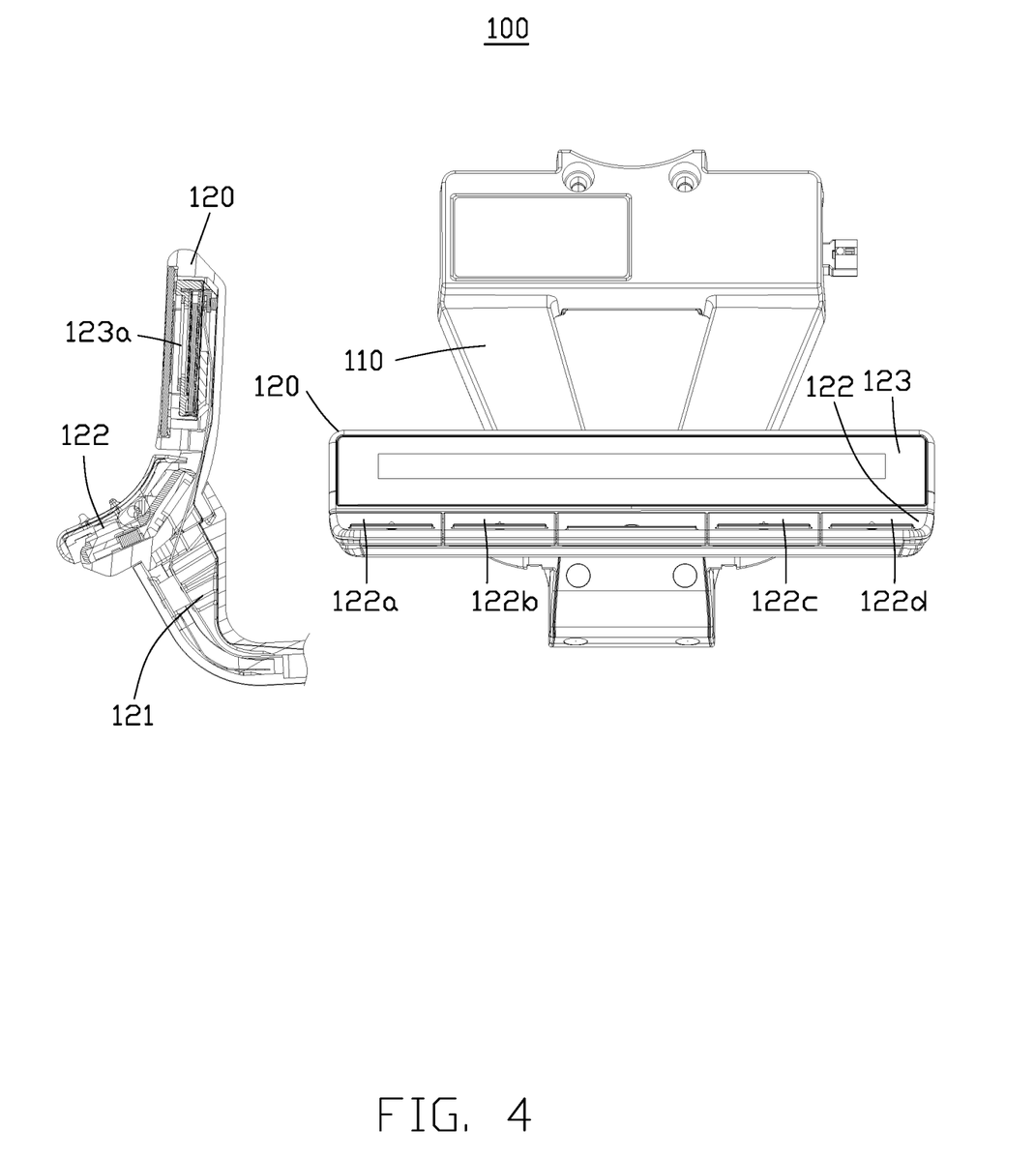
FIG. 4 is a structure diagram of one embodiment of the control panel according to the present application.

FIG. 4 is a structure diagram of one embodiment of the control panel 120 according to the present application.

The control panel comprises a mounting base 121, a button component 122, and a display component 123. The mounting base 121 is fixedly arranged on the second end of the support arm 110. The button component 122 and the display component 123 are fixedly arranged on the mounting base 121. The button component 122 is configured to output the trigger signal. The display component 123 is configured to display the corresponding vehicle status information according to the display signal.

In one embodiment, the trigger signal can be output by touching the button component 122, and the display component 123 can display the feedback information after the button component 122 is triggered. The button component 122 and the display component 123 are fixed on the second end of the support arm 110 by mounting the base 121. When the main control screen 200 rotates, the position of the button component 122 remains unchanged, so that the driver can get used to the position and touch of the button component 122.

In one embodiment, the button component 122 matches with the display component 123, and both of them are fixedly arranged on the mounting base 121 at the second end of the support arm 110, to form a suspended control panel 120, which allows the driver to control the vehicle equipment more easily, and perceive the feedback of the control more intuitively. Among them, the display component 123 can be implemented by a liquid crystal display (LCD) screen.

In one embodiment, the display component 123 is arranged on an upper area of the mounting base 121, and is further arranged at an angle with the main control screen 200. The button component 122 is arranged on a lower area of the mounting base 121 in an arc shape, and an inner side of the arc is away from the main control screen.

In one embodiment, the main control screen 200 can be arranged in the direction of the vertical plane, or at a certain angle with the vertical plane, so that the operator can view the contents of the main control screen 200 without looking down. Among them, the vehicle chassis can be the horizontal plane, and the vertical plane is the plane perpendicular to the vehicle chassis. Further, the display component 123 is arranged at an angle with the main control screen 200, so that the display surface of the display component 123 can toward the operator and fit with the operator's line of sight, thus the operator can clearly view the content on the display component 123. The button component 122 is arranged in an arc shape, and the inner side of the arc faces the operator, which not only allows the operator to see each button on the button component 122, but also facilitates the operator to press and touch. The operator can perceive the function of the button based on the position of the button, improving the user's comfort. Furthermore, different button shapes can be designed according to different button functions. Users can determine the button functions by perceiving the button shapes by touching, so as to improve the recognition of buttons.

In one embodiment, the button component 122 comprises a temperature control button 122a, a wind speed control button 122b, a volume control button 122c, and a rotation button 122d. The temperature control button 122b is configured to output a temperature control signal, and the host of the vehicle 1 is configured to set an objective temperature according to the temperature control signal, and output a temperature display signal according to the objective temperature. The wind speed control button 122b is configured to output the wind speed control signal, and the host of the vehicle 1 is configured to set an objective wind speed according to the wind speed control signal, and output a wind speed display signal according to the objective wind speed. The volume control button 122c is configured to output a volume control signal, and the host of the vehicle 1 is configured to set an objective volume according to the volume control signal, and output a volume display signal according to the objective volume. The rotation button 122d is configured to output a rotation control signal, and the host of the vehicle 1 is configured to control the rotation of the main control screen 200 according to the rotation control signal, and output a position display signal according to the position after the rotation of the main control screen 200.

In one embodiment, the operator can achieve temperature adjustment, wind speed adjustment, volume adjustment, and position adjustment of the main control screen 200 by pressing the temperature control button 122a, the wind speed control button 122b, the volume control button 122c, and the rotation button 122d. The display component 123 can display the adjusted temperature, the adjusted wind speed, the adjusted volume and the position information of the main control screen 200 according to the received display signal.

In one embodiment, the display component 123 comprises a touch screen 123*a*. The touch screen 123*a* is configured to output the trigger signal, and the touch screen 123*a* is further configured to display the corresponding vehicle status information according to the display signal. Thus, the operator can also touch the touch screen 123*a* to output the trigger signal, and achieve diversification of control methods.

Figure 5:
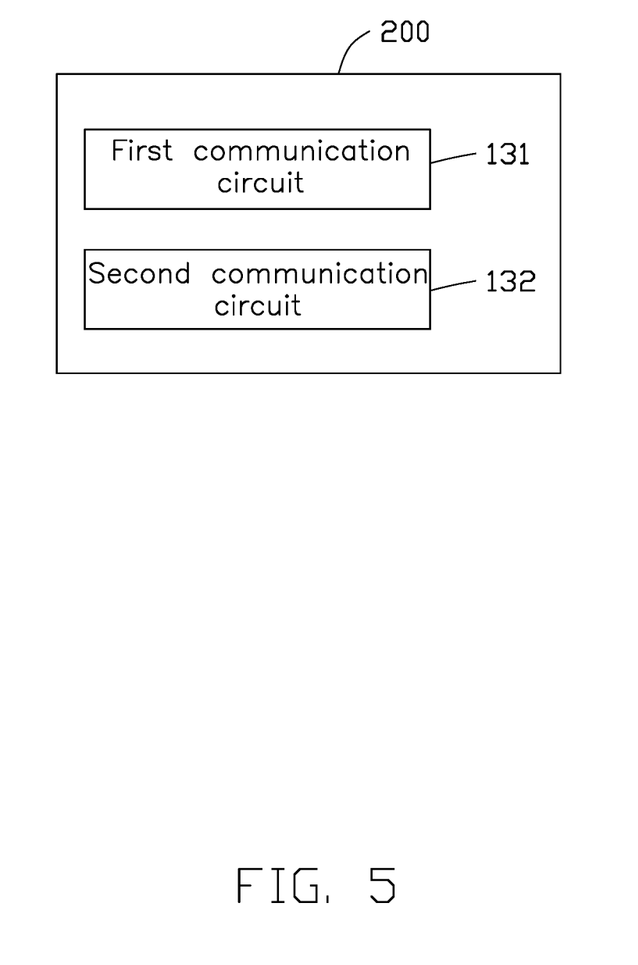
FIG. 5 is a diagram of one embodiment of a signal transmission circuit board according to the present application.

FIG. 5 is a diagram of one embodiment of a signal transmission circuit board 130 according to the present application.

The signal transmission circuit board 130 comprises a first communication circuit 131 and a second communication circuit 132. The first communication circuit 131 is configured to access the power supply voltage and transmit the power supply voltage to the second communication circuit 132. The second communication circuit 132 is configured to transmit the power supply voltage to the display component 123. The second communication circuit 132 is further configured to receive the display signal and transmit the display signal to the control panel 120. The second communication circuit 132 is further configured to transmit the trigger signal to the host of the vehicle 1.

In one embodiment, the first communication circuit 131 can convert the power supply voltage into the first voltage required by the second communication circuit 132 to supply power to the second communication circuit 132, and the second communication circuit 132 can transmit the first voltage to the display component 123 to drive the backlight irradiation display layer of the display component 123 to emit light. The second communication circuit 132 can also adjust the brightness of the display component 123 by adjusting the voltage output to the display component 123. The first communication circuit 131 can comprise a switching tube through which the supply voltage can be transmitted to the second communication circuit 132. When the first communication circuit 131 receives abnormal voltage (for example, the positive and negative terminals of the power supply are reversed), the switching tube is disconnected, and then the transmission path of the power supply voltage is disconnected, which plays a protective role to avoid the abnormal voltage damaging the display control device 100. The first communication circuit 131 can also receive the trigger signal output by the control panel 120, and transmit it to the host of the vehicle 1, so that the host can perform the corresponding operation according to the trigger signal, and output the corresponding display signal to the second communication circuit 132, and then the second communication circuit 132 can transmit the display signal to the control panel 120 for display. Among them, the first communication circuit 131 can comprise a communication chip and a boost/buck chip, and the second communication circuit 132 can comprise a communication chip.

Figure 6:
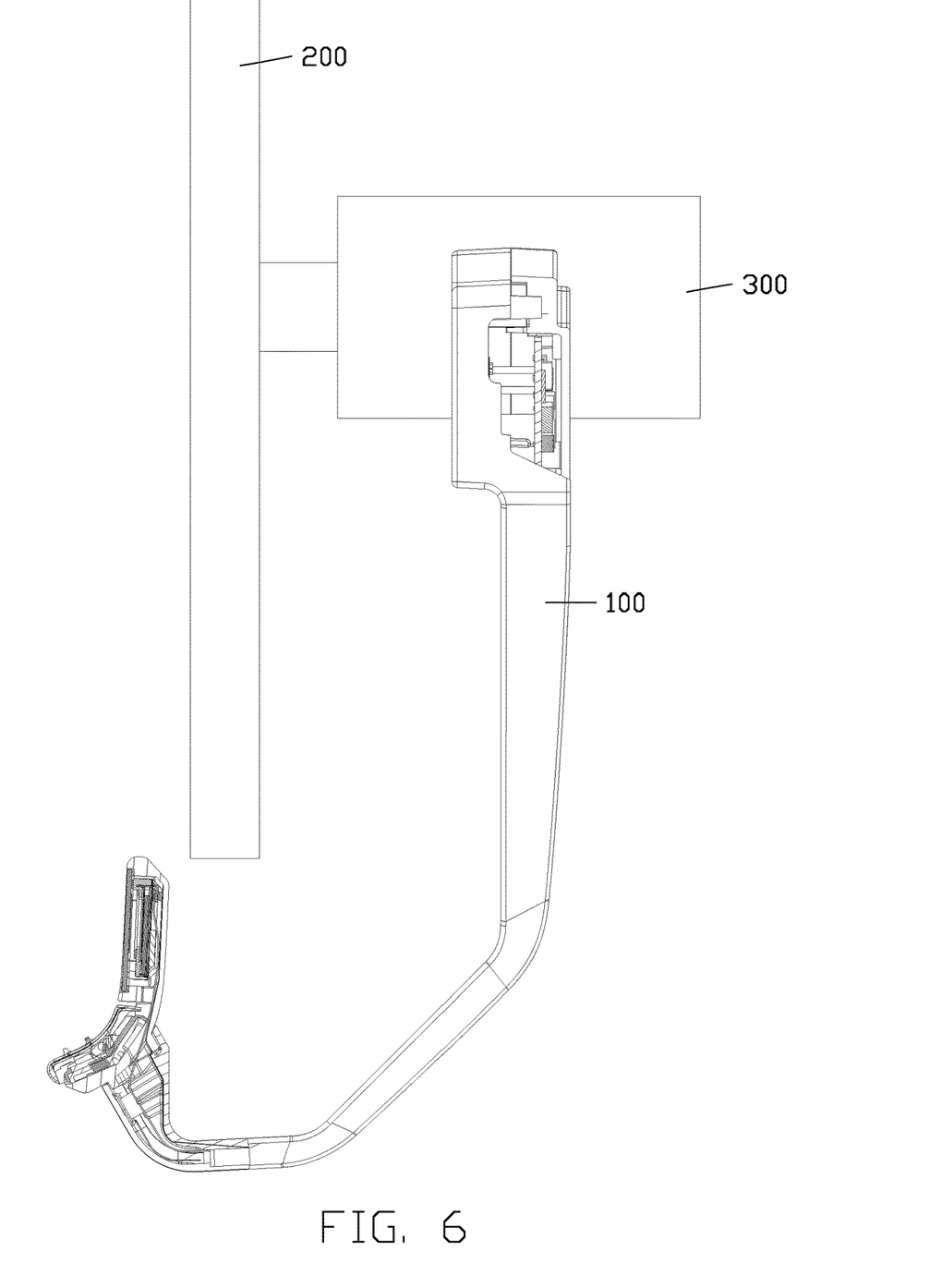
FIG. 6 is a diagram of one embodiment of a display equipment according to the present application.

FIG. 6 is a diagram of one embodiment of a display equipment 10 according to the present application.

The display equipment 10 comprises a main control screen 200 and a display control device 100.

The detailed structure of the display control device 100 can be referred to the above embodiments. It is understandable that because the display control device 100 is used in the display equipment 10, the embodiment of the display equipment 10 comprises all the technical schemes of all the embodiments of the display control device 100, and the technical effects achieved are exactly the same.

In one embodiment, the display equipment 100 further comprises a motor component 300, the motor component 300 is configured to receive a rotation control signal and drive the main control screen 200 to rotate according to the rotation control signal.

In one embodiment, on a vertical plane, the main control screen 200 is arranged between the motor assembly 300 and the display control device 100, and the display control device 100 is suspended below the main control screen 200, which can provide sufficient space for the main control screen 200 to rotate.

FIG. 7 is a diagram of one embodiment of a vehicle 1 according to the present application. The vehicle 1 comprises a display equipment 10.

The detailed structure of the display equipment 10 can be referred to the above embodiments. It is understandable that because the display equipment 10 is used in the vehicle 1, the embodiment of the vehicle 1 comprises all the technical schemes of all the embodiments of the display equipment 10, and the technical effects achieved are exactly the same.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A display control device, applied to a vehicle, the vehicle comprising a main control screen, the display control device comprising a support arm, a control panel, and a signal transmission circuit board;
wherein a first end of the support arm is equipped with the main control screen, a second end of the support arm extends to a direction away from a front surface of the main control screen, and the control panel is arranged on the second end of the support arm;
the signal transmission circuit board is arranged in the support arm and electrically connected with the control panel, the control panel is configured to output a trigger signal, the signal transmission circuit board is configured to transmit the trigger signal to a host of the vehicle, the signal transmission circuit board is further configured to receive a display signal and transmit the display signal to the control panel, the display signal is configured to control the control panel to display corresponding vehicle status information.

2. The display control device of claim 1, wherein the support arm is a Y-shaped structure, an upper end of the Y-shaped structure is equipped with the main control screen, a lower end of the Y-shaped structure extends away from the front surface of the main control screen, the control panel is arranged on the lower end of the Y-shaped structure.

3. The display control device of claim 1, wherein the control panel comprises a mounting base, a button component, and a display component, the mounting base is fixedly arranged on the second end of the support arm, and the button component and the display component are fixedly arranged on the mounting base, the button component is configured to output the trigger signal, the display component is configured to display the corresponding vehicle status information according to the display signal.

4. The display control device of claim 3, wherein the display component is arranged on an upper area of the mounting base, and is set at an angle with the main control screen, the button component is arranged on a lower area of the mounting base in an arc shape, and an inner side of the arc is away from the main control screen.

5. The display control device of claim 3, wherein the button component comprises a temperature control button, a wind speed control button, a volume control button, and a rotation button;
the temperature control button is configured to output a temperature control signal, and the host of the vehicle is configured to set an objective temperature according to the temperature control signal, and output a temperature display signal according to the objective temperature;
the wind speed control button is configured to output the wind speed control signal, and the host of the vehicle is configured to set an objective wind speed according to the wind speed control signal, and output a wind speed display signal according to the objective wind speed;
the volume control button is configured to output a volume control signal, and the host of the vehicle is configured to set an objective volume according to the volume control signal, and output a volume display signal according to the objective volume;
the rotation button is configured to output a rotation control signal, and the host of the vehicle is configured to control the rotation of the main control screen according to the rotation control signal, and output a position display signal according to the position after the rotation of the main control screen.

6. The display control device of claim 3, wherein the display component comprises a touch screen, the touch screen is configured to output the trigger signal, and the touch screen is further configured to display the corresponding vehicle status information according to the display signal.

7. The display control device of claim 1, wherein the signal transmission circuit board comprises a first communication circuit and a second communication circuit;
the first communication circuit is configured to access the power supply voltage and transmit the power supply voltage to the second communication circuit;
the second communication circuit is configured to transmit the power supply voltage to the display component, the second communication circuit is further configured to receive the display signal and transmit the display signal to the control panel, the second communication circuit is further configured to transmit the trigger signal to the host of the vehicle.

8. A display equipment comprising a main control screen and a display control device, the display control device comprising a support arm, a control panel, and a signal transmission circuit board;
wherein a first end of the support arm is equipped with the main control screen, a second end of the support arm extends to a direction away from a front surface of the main control screen, and the control panel is arranged on the second end of the support arm,
the signal transmission circuit board is arranged in the support arm and electrically connected with the control panel, the control panel is configured to output a trigger signal, the signal transmission circuit board is configured to transmit the trigger signal to a host of the vehicle, the signal transmission circuit board is further configured to receive a display signal and transmit the display signal to the control panel, the display signal is configured to control the control panel to display corresponding vehicle status information.

9. The display equipment of claim 8, wherein the display equipment further comprises a motor component, the motor component is configured to receive a rotation control signal and drive the main control screen to rotate according to the rotation control signal.

10. The display equipment of claim 8, wherein the support arm is a Y-shaped structure, an upper end of the Y-shaped structure is equipped with the main control screen, a lower end of the Y-shaped structure extends away from the front surface of the main control screen, the control panel is arranged on the lower end of the Y-shaped structure.

11. The display equipment of claim 8, wherein the control panel comprises a mounting base, a button component, and a display component, the mounting base is fixedly arranged on the second end of the support arm, and the button component and the display component are fixedly arranged on the mounting base, the button component is configured to output the trigger signal, the display component is configured to display the corresponding vehicle status information according to the display signal.

12. The display equipment of claim 11, wherein the display component is arranged on an upper area of the mounting base, and is set at an angle with the main control screen, the button component is arranged on a lower area of the mounting base in an arc shape, and an inner side of the arc is away from the main control screen.

13. The display equipment of claim 11, wherein the button component comprises a temperature control button, a wind speed control button, a volume control button, and a rotation button;
the temperature control button is configured to output a temperature control signal, and the host of the vehicle is configured to set an objective temperature according to the temperature control signal, and output a temperature display signal according to the objective temperature;
the wind speed control button is configured to output the wind speed control signal, and the host of the vehicle is configured to set an objective wind speed according to the wind speed control signal, and output a wind speed display signal according to the objective wind speed;
the volume control button is configured to output a volume control signal, and the host of the vehicle is configured to set an objective volume according to the volume control signal, and output a volume display signal according to the objective volume;
the rotation button is configured to output a rotation control signal, and the host of the vehicle is configured to control the rotation of the main control screen according to the rotation control signal, and output a position display signal according to the position after the rotation of the main control screen.

14. The display equipment of claim 11, wherein the display component comprises a touch screen, the touch screen is configured to output the trigger signal, and the touch screen is further configured to display the corresponding vehicle status information according to the display signal.

15. The display equipment of claim 8, wherein the signal transmission circuit board comprises a first communication circuit and a second communication circuit;

the first communication circuit is configured to access the power supply voltage and transmit the power supply voltage to the second communication circuit;

the second communication circuit is configured to transmit the power supply voltage to the display component, the second communication circuit is further configured to receive the display signal and transmit the display signal to the control panel, the second communication circuit is further configured to transmit the trigger signal to the host of the vehicle.

16. A vehicle comprising a display equipment, the display equipment comprising a main control screen and a display control device, the display control device comprising a support arm, a control panel, and a signal transmission circuit board;

wherein a first end of the support arm is equipped with the main control screen, a second end of the support arm extends to a direction away from a front surface of the main control screen, and the control panel is arranged on the second end of the support arm, the signal transmission circuit board is arranged in the support arm and electrically connected with the control panel, the control panel is configured to output a trigger signal, the signal transmission circuit board is configured to transmit the trigger signal to a host of the vehicle, the signal transmission circuit board is further configured to receive a display signal and transmit the display signal to the control panel, the display signal is configured to control the control panel to display corresponding vehicle status information.

\* \* \* \* \*